United States Patent [19]

Gersbeck et al.

[11] 3,915,612
[45] Oct. 28, 1975

[54] APPARATUS FOR THE CONTINUOUS MANUFACTURE OF PRESSED PANELS FOR LOOSE MATERIALS

[75] Inventors: Rolf Gersbeck, Hannover; Heinz Brinkmann, Bennigsen, both of Germany

[73] Assignee: Hermann Berstorff Maschinenbau GmbH, Hannover-Kleefeld, Germany

[22] Filed: Feb. 19, 1974

[21] Appl. No.: 443,242

[30] Foreign Application Priority Data
  Feb. 22, 1973   Germany............................ 2308696

[52] U.S. Cl. ........ 425/373; 425/224; 425/DIG. 200
[51] Int. Cl.² ........................................ B29C 15/00
[58] Field of Search ........... 425/363, 373, 223, 224, 425/385, 383, DIG. 200; 264/175

[56] References Cited
UNITED STATES PATENTS

| | | | |
|---|---|---|---|
| 2,442,443 | 6/1948 | Swallow | 425/373 |
| 2,446,771 | 8/1948 | Knowland | 425/373 X |
| 2,526,318 | 10/1950 | Battin | 425/373 X |
| 2,891,279 | 6/1959 | Neumann | 425/373 UX |
| 3,121,912 | 2/1964 | Dieckmann | 425/371 UX |
| 3,241,182 | 3/1966 | Kessler | 425/327 X |
| 3,399,425 | 9/1968 | Lemelson | 425/385 X |
| 3,470,583 | 10/1969 | Denyes et al. | 425/363 X |
| 3,734,669 | 5/1973 | Ettel | 425/373 |

Primary Examiner—Robert L. Spicer, Jr.
Attorney, Agent, or Firm—Donald D. Jeffery

[57] ABSTRACT

The continuous manufacture of pressed panels such as chipboard or fibreboard from loose material is effected on apparatus having a taut, endless belt passing sequentially around a portion of the periphery of each of a feed roll, a squeeze drum and a counter pressure roll, the loose material being loaded onto the belt and squeezed between the belt and the squeeze drum, the feed roll and counter pressure roll acting on an opposite face of the belt to that bearing the material, at least the feed roll and squeeze roll being heated, a line perpendicular to a line joining the axes of the squeeze drum and the feed roll forming an angle of between 0° 40° with the horizontal and the distance between the feed roll and the counter pressure roll being such that regression of the compressed loose material at the outlet from the counter pressure roll is avoided.

16 Claims, 2 Drawing Figures

APPARATUS FOR THE CONTINUOUS MANUFACTURE OF PRESSED PANELS FOR LOOSE MATERIALS

The invention relates to a machine for the continuous manufacture of chipboard panels, fibreboard panels or the like.

In previously proposed methos of manufacturing chipboard panels, a mass of chips impregnated with a binder is compressed into panels under pressure and with simultaneous activation of the binder. The binder is preferably a duroplastic adhesive which is made active by heating. It is known to carry out the compression process with a flat press. However, since considerable tolerances in the thickness of the panel arise in the compression process, the panel has to be subsequently abraded, which is extremely uneconomic.

For continuous manufacture of chipboard panels it has also been proposed to feed the mass of chips onto an endless belt which is guided past a heated rotating squeeze drum, and to compress the mass into a chipboard panel between the belt and the squeeze drum by means of further counter pressure rolls. The chipboard panels which can particularly be made with an apparatus of this kind are thin ones with a thickness of 1.6 to 10 mm. The endless belt, made of a special steel, is looped around approximately three quarters of the squeeze drum, which is preferably about 3 m. in diameter.

The relatively large squeeze drum and the large angle of looping result in relatively large and thus expensive calender supports to accommodate the drum and the rolls. In addition, the endless belt must be approximately 40 m. long. As the belt is subject to contact alternating bending loads, its life is limited.

According to the invention there is provided apparatus for continuously producing chipboard panels, fibreboard panels and the like, comprising a rotatable squeeze drum; a taut, endless belt, onto which belt a mass of chips provided with a binder can be fed to be compressed between the squeeze drum and the belt; heating means for the squeeze drum; and two rolls around which the belt is looped, which two rolls comprise a feed roll to receive the mass of chips and a counter pressure roll to discharge a compressed panel; the squeeze drum being so disposed relative to said two rolls that the belt is looped around part of the periphery of the squeeze drum, a line perpendicular to a line joining the axes of the squeeze drum and the feed roll forms an angle of between 0° and 40° with the horizontal, and the distance between the feed roll and the counter pressure roll is such that regression of the compressed mass of chips at the outlet from the counter pressure roll is avoided.

In the past, a relatively large angle of approximately 300° has been selected, through which the belt is looped around the squeeze drum. The invention, on the other hand, is based on the realisation that a satisfactory compression process can be obtained with a shorter compression time at the squeeze drum and a much smaller looping angle. In the invention, the looping angle is less than 180°, for example 60° to 90°. This reduction in the looping angle can result in a simpler construction and particularly in smaller calender supports. The invention also permits a considerable reduction in alternating bending loads, so that the life of the endless belt is much extended. With the looping angle smaller, the belt is also desirably shortened. Because there is less curvature the machine according to the invention can also produce thicker chipboard panels than was previously possible. With the specially dimensioned angle between the horizontal and the relative positions of the feed roll and squeeze drum, the mass of chips fed onto the belt is not changed in structure as it enters the compression gap between the feed roll and the squeeze drum; that is to say, once the chip structure (an outer layer of fine chips, an inner layer of coarse chips and another outer layer of fine chips) is spread over the belt, that structure is maintained.

The invention is diagrammatically illustrated by way of example in the accompanying drawings, in which:-

Figure 1:
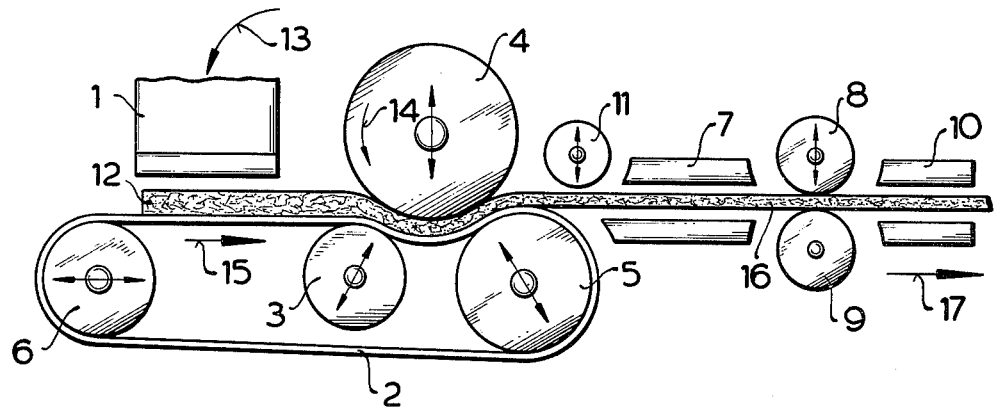
FIG. 1 shows a first embodiment of apparatus according to the invention.

Referring to FIG. 1, there is shown a shaping station 1, an endless steel belt 2, a feed roll 3, a squeeze drum 4, a counter pressure roll 5 and a tension roll 6. The belt 2 is looped around the rolls 3, 5, 6 and, together with the squeeze drum 4, forms a gap for compressing the mass of chips. Also provided are a first heating channel 7, two calibrating rolls 8, 9, a second heating channel 10 and an additional guide roll 11. The double arrows in each case indicate the directions in which the shafts of the rolls and drum can be adjusted to obtain optimum working.

In operation, a mass of chips 12 is fed onto the belt 2 via the shaping station 1 in a predetermined structural distribution. For this purpose the belt 2 has a flat horizontal portion between the tension roll 6 and the feed reel 3.

The roll 6 is driven and drags the rolls 3, 4 and 5 along with it with the aid of the endless belt 2. The mass of chips 12 is thereby first guided into the gap between the feed roll 3 and the squeeze drum 4 by the belt moving in direction 15. There is a consequent compression of the mass 12 as illustrated in the drawing. The compressed mass 12 is thereafter pressed against the squeeze drum 4 by the very taut endless belt 2, thereby preventing the mass from springing back to its original position once it has left the compression gap. The squeeze drum 4 and feed roll 3 are heated with steam, so that the duroplastic adhesive contained in the mass 12 is simultaneously activated. A renewed squeezing operation takes place between the squeeze drum 4 and the counter pressure roll 5, in which thickness is further reduced and consolidation further increased. A compressed, as yet still flexible web of chipboard, emerges from the counter pressure roll 5, is taken past the guide roll 11 and passed to a first heating channel 7. Where thicker webs of chipboard are being produced the calibrating rolls 8, 9 serve to give the chipboard 16 its exact dimensions and to compensate for any inaccuracies. The final curing of the chipboard takes place in the second heating channel 7, and the board now leaves the machine in direction 17 in the form of a continuous endless strip. Chipboard panels of the required length can subsequently be cut from this strip.

The angle between the vertical and a line direction connecting the axes of the feed roll 3 and squeeze drum 4 is approximately 37.5° in this example. The effect of this is to prevent any undesirable displacement of the individual layers of the mass 12 at the place where it moves between the feed roll 3 and squeeze drum 4. It will be seen that the angle through which the belt 2 is looped around the squeeze drum 4 is relatively small. However, it is sufficient to give adequate compression of the mass 12.

In order to prevent the binder from reacting and changing the structure of the mass while the mass is still on the section of belt 2 between the rolls 6 and 3, steps are taken to cool the belt 2 adequately in this section. This is done by providing additional cooling for the roll 6. With the same end in view, the diameter of the counter pressure roll 5 is made larger than that of the feed roll 3. This means that when the belt returns from the roll 5 to the roll 6 it does not touch the roll 3 and cannot be undesirably heated by it. The tension of the belt 2 can be adjusted by moving the tension roll 6 in the direction of the double arrow. By tilting the shaft of the drum 6, i.e. by raising one side of the shaft, the belt 2 can be returned to the desired position if it has worked sideways. The fact that the rolls 3, 5, 6 are arranged substantially in one plane gives a particularly compact construction, so that the calender supports provided to hold the rolls can also be small. It will be appreciated that the alternating bending load on the endless belt 2 can also be reduced with this arrangement.

Where thicker panels are being produced it is desirable for the heating channels 7, 10 to be correspondingly longer. The arrangement may also be modified to make the metal belt loop around the rolls 3 and 5 only, with the mass of chips 12 being fed to the squeeze drum 4 by an additional, less expensive belt.

The squeeze drum 4 and the two rolls 3, 5 are preferably heated, and further heating may additionally be provided for the steel belt 2. Heating is preferably provided by steam, and the heating temperature is approximately 150° to 200° where a duroplastic adhesive is used. The squeeze pressure, taken as line pressure between the squeeze drum 4 and the roll 3, is approximately 130 kg/cm$^2$ and the pressure created by the taut endless belt 2 while it is looped around the squeeze drum 4 is approximately 5 kg/cm$^2$. The squeeze pressure, taken as line pressure between the counter pressure roll 5 and the squeeze drum 4, is at least equal to the line pressure between the feed roll 3 and the squeeze drum 4. By adjusting the rolls and the squeeze drum in the direction of the double arrows the compression gap can be varied, so that panels of different thicknesses can be produced on the same machine.

Figure 2:
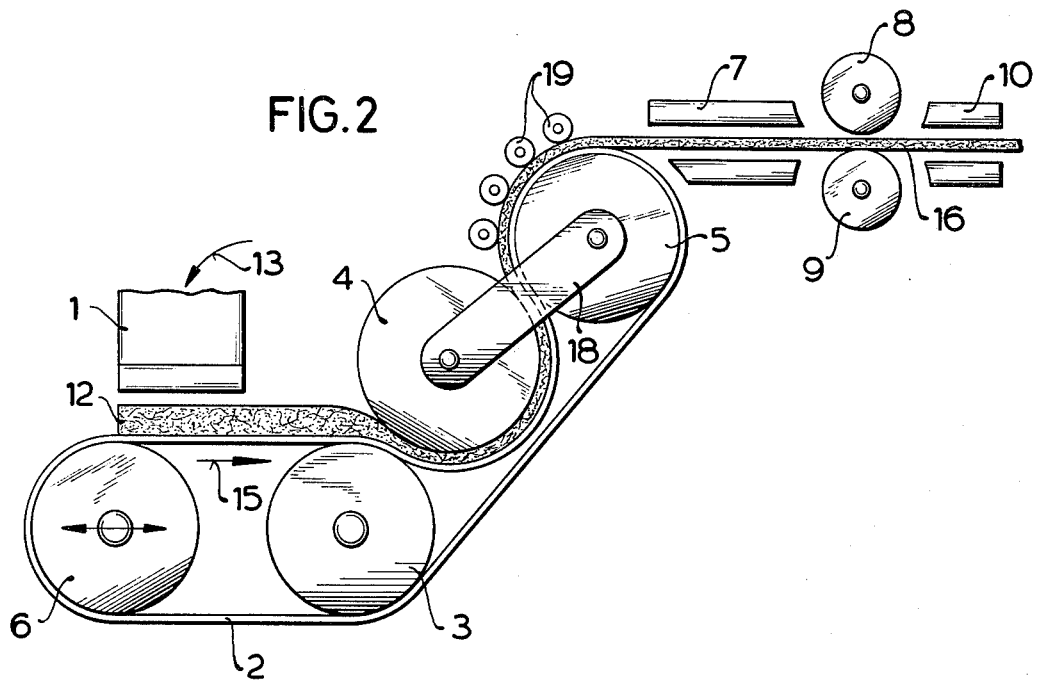
FIG. 2 shows a second embodiment of apparatus according to the invention.

In the embodiment shown in FIG. 2, the shafts of the squeeze drum 4 and rolls 3, 5 lie approximately in one plane and the belt 2 is guided around this unit in a figure of eight. The squeeze drum 4 and counter pressure roll 5 are mounted in a common frame 18.

The squeeze drum 4 or the counter pressure roll 5 may be arranged adjustably in the frame 18 so that chipboard panels of varying thickness can be manufactured. The mass of chips 12 is again compressed both in the gap between the feed roll 3 and the squeeze drum 4 and in the gap between the counter pressure roll 5 and the squeeze drum 4. The gap between the roll 5 and the drum 4 is preferably smaller than that between the roll 3 and the drum 4.

The distance between the rolls 3 and 5 and thus the angle through which the belt 2 is looped around the squeeze drum 4 are always such that no regression of the compressed chips can ever take place (i.e. so that the chips can never work out of their compressed shape) at the point of impact of the compressed panel between the squeeze drum 4 and the counter pressure roll 5. In the FIG. 2 embodiment, a plurality of heated direction-changing rollers 19 are provided on the counter pressure roll 5. The function of these rollers is to keep the compressed panel flexible while it is moving round the roll 5. The actual final curing of the panel again takes place in the heating channel 10.

The machine according to the invention is universally suitable for compressing panels of loose material, for example for hard fibre panels and also for compressing other materials impregnated with binders, such as waste substances.

In a tested example drums 3, 4 and 5 with a diameter of 1,400 mm, an angle of looping around the squeeze drum 4 of 70° to 80° and a peripheral speed of 15 m/min were selected for a panel thickness of 3 mm. The webs of chipboard formed thereby was found to be fully cured.

What is claimed is:

1. Apparatus for continuously pressing chipboard or fibre board panels from loose fibrous materials comprising a rotatable squeeze drum; a taut, endless steel belt onto which a mass of such loose material provided with a binder can be fed to be compressed between the squeeze drum and the belt; heating means for the squeeze drum; and two rolls around which the belt is looped, which two rolls comprise a feed roll which defines with said squeeze drum a gap which receives the mass of loose material carried by said belt and compresses the same through linear pressure, and a counter pressure roll spaced arcuately around the periphery of said drum from said feed roll and which defines with said squeeze drum a gap through which the partially compressed panel passes for further compression of said panel by linear pressure; an adjustable tension roll having said belt looped therearound whereby the tension of said belt can be adjusted, the squeeze drum being so disposed relative to said feed and counter pressure rolls that the belt is tautly looped, a line joining the axes of the squeeze drum and the feed roll forms an angle of between 0° and 40° with the vertical, and the arcuate distance between the feed roll and the counter pressure roll is such that the partially compressed material is pressed against said squeeze drum by said endless steel belt with sufficient pressure to avoid retrogression from its compressed state until it is further compressed by passage through the gap between said squeeze drum and said counter pressure roll.

2. Apparatus as claimed in claim 1, wherein the arc of the periphery of the squeeze drum around which the belt is looped, subtends an angle of less than 180°.

3. Apparatus as claimed in claim 1, wherein said angle is 37.5°.

4. Apparatus as claimed in claim 1, wherein the squeeze drum lies above the two rolls and said two rolls are approximately at the same level as one another.

5. Apparatus as claimed in claim 4, wherein the level of the squeeze drum is adjustable and said two rolls are adjustable radially of the squeeze drum.

6. Apparatus as claimed in claim 1, wherein the diameter of the counter pressure roll is larger than the diameter of the feed roll and the diameter of each of the two rolls is smaller than the diameter of the squeeze drum.

7. Apparatus as claimed in claim 1, including a guide roll, the level of which is adjustable and which is provided at an outlet position between the squeeze drum and the counter pressure roll.

8. Apparatus as claimed in claim 1, including an adjustable tension roll having the belt looped therearound whereby the tension of the belt can be adjusted.

9. Apparatus as claimed in claim 8, wherein the diameters of said two rolls and the diameter of the tension roll are such that the belt does not touch the feed roll on its return from the counter pressure roll to the tension roll.

10. Apparatus as claimed in claim 8, wherein the axes of the feed roll, counter pressure roll and tension roll lie approximately in the same plane.

11. Apparatus as claimed in claim 8, wherein the tension roll is arranged so that a portion of the belt extending between the tension roll and the side of the feed roll facing towards the squeeze drum is substantially flat and serves to receive the mass of chips.

12. Apparatus as claimed in claim 8, including cooling means for the tension roll.

13. Apparatus as claimed in claim 1, including means for heating said two rolls.

14. Apparatus as claimed in claim 1, including a curing section for the binder at the outlet of a compression section formed by the squeeze drum, said two rolls and the belt.

15. Apparatus as claimed in claim 1, including calibrating rolls to correct the thickness of the web and disposed in the path of the compressed web downstream of the counter pressure roll.

16. Apparatus for continuously pressing chipboard or fibre board panels from loose fibrous materials comprising a rotatable squeeze drum; a taut, endless belt onto which a mass of such loose material provided with a binder can be fed to be compressed between the squeeze drum and the belt; heating means for the squeeze drum; and two rolls around which the belt is looped, which two rolls comprise a feed roll which defines with said squeeze drum a gap which receives the mass of loose material carried by said belt and compresses the same through linear pressure, and a counter pressure roll spaced arcuately around the periphery of said drum from said feed roll and which defines with said squeeze drum a gap through which the partially compressed panel passes for further compression of said panel by linear pressure; said squeeze drum and said counter pressure roll being mounted on a common frame and the axes of said squeeze drum, feed and counter pressure rolls being in substantially the same plane and said belt being guided around said squeeze drum and said feed and counter pressure rolls substantially in a figure of eight; the squeeze drum being so disposed relative to said feed and counter pressure rolls that the belt is tautly looped, a line joining the axes of the squeeze drum and the feed roll forms an angle of between 0° and 40° with the vertical, and the arcuate distance between the feed roll and the counter pressure roll is such that the partially compressed material is pressed against said squeeze drum by said taut endless belt with sufficient pressure to avoid retrogression from its compressed state until it is further compressed by passage through the gap between said squeeze drum and said counter pressure roll.

* * * * *